United States Patent [19]

Olson

[11] Patent Number: 5,427,399
[45] Date of Patent: Jun. 27, 1995

[54] TRACTOR HITCH WITH LOCK

[76] Inventor: Brian R. Olson, 3018 Gordon Road, Regina, Saskatchewan, Canada, S4S 2T8

[21] Appl. No.: 157,174

[22] Filed: Dec. 7, 1993

[30] Foreign Application Priority Data

Jun. 7, 1991 [CA] Canada ................. 2044190

[51] Int. Cl.[6] ........................... B60D 1/26
[52] U.S. Cl. .................... 280/515; 280/508
[58] Field of Search ........... 280/515, 507, 508, 509, 280/511, 512, 504, 477, 478.1, 479.1

[56] References Cited

U.S. PATENT DOCUMENTS

| | | | |
|---|---|---|---|
| 1,401,873 | 12/1921 | Buller | 280/512 |
| 2,320,168 | 5/1943 | Benjamin et al. | 280/479.1 |
| 3,313,558 | 4/1967 | Wolfgang | 280/515 |
| 3,462,172 | 8/1969 | Thor | 280/479.1 |
| 4,343,484 | 8/1982 | Van Antwerp | 80/479.1 |
| 4,482,166 | 11/1984 | Van Antwerp | 280/479.1 |
| 4,702,489 | 10/1987 | Erickson | 280/479.1 |
| 5,193,838 | 3/1993 | Olson | 280/515 |

FOREIGN PATENT DOCUMENTS

| | | | |
|---|---|---|---|
| 0308271 | 3/1989 | European Pat. Off. | |
| 660922 | 12/1930 | France | |
| 3918536 | 12/1990 | Germany | 280/515 |
| 2241214 | 8/1991 | United Kingdom | 280/515 |

Primary Examiner—Margaret A. Focarino
Assistant Examiner—Kevin Hurley
Attorney, Agent, or Firm—Murray E. Thrift; Adrian D. Battison; Stanley G. Ade

[57] ABSTRACT

A power operated, draw bar mounted hitch for connection to the tongue of a farm implement has a fixed draw pin and a bottom hammer strap that engages under the tongue and raises the tongue onto the draw bar, where it is captured in place between the bottom hammer strap and a top hammer strap mounted on the draw bar. The hitch has an automatic self locking feature that automatically locks the hitch when it reaches the engaged position.

19 Claims, 5 Drawing Sheets

TRACTOR HITCH WITH LOCK

FIELD OF THE INVENTION

The present invention relates to tractor hitches and more particularly to a power operated hitch for hitching farm implements to tractors.

BACKGROUND

With very large agricultural implements, pulled by large, very powerful tractors, hitching the implements to a tractor can be quite difficult. Where the implement tongue needs to be lifted into the hitch, the high tongue weight makes it necessary to lift the tongue with a jack. Driving a draw pin into a slightly misaligned draw bar and tongue also requires the application of considerable force.

while various hitches have been proposed for use in conjunction with three point hitches which allow movement of the hitch into line with the tongue, these are complex devices and unsuited to drawing a large implements with high draft forces.

The present invention is therefore concerned with an novel tractor hitch for use with large, heavy implements and high powered tractors.

SUMMARY

According to one aspect of the present invention there is provided a hitching apparatus for coupling a draw bar of a towing vehicle to a tongue of a towed vehicle, said apparatus comprising a draw pin; pin mounting means for mounting the draw pin on the draw bar, with the pin projecting downwardly; a bottom hammer strap having an opening therein for receiving the draw pin; and a bottom hammer strap mounting means for mounting the bottom hammer strap on the draw bar for movement between a retracted position below the draw pin and an engaged position with the opening engaged on the draw pin, spaced below the pin mounting means, whereby the bottom hammer strap may, in the retracted position, be engaged under the tongue and moved to the engaged position to raise the bottom hammer strap and the tongue into engagement with the draw pin, characterized in that:

in the engaged position, the bottom hammer strap extends along the bottom face of the draw bar, and inter-engagable means are provided on the draw bar and the bottom hammer strap for transmitting towing loads from the bottom hammer strap to the draw bar when the bottom hammer strap is in the engaged position.

According to another aspect of the present invention there is provided a draw bar assembly mounting on draw bar assembly mountable on a towing vehicle for coupling the vehicle to a tongue of a towed vehicle, said apparatus comprising:

an elongate draw bar having a mounting end adapted to be mounted on the towing vehicle and an opposite hitch end with a draw pin hole therein;

a hammer strap having a draw pin hole therein;

hammer strap mounting means mounting the hammer strap on the draw bar below the hitch end thereof for movement between a retracted position and an engaged position closer to the draw bar and with the draw pin hole aligned with the draw pin hole of the draw bar;

power operated means for moving the hammer strap between the retracted and engaged positions; and lock means responsive to movement of the bottom hammer strap into the engaged position to lock the bottom hammer strap in the engaged position; characterized in that the lock means comprise a lock arm, means mounting the lock arm on the hammer strap for movement therewith, the lock arm having a locking position engaging a stationary part of the apparatus to prevent movement of the hammer strap to the retracted position and an unlocked position out of engagement with said stationary pan of the apparatus, freeing the bottom hammer strap to move to the retracted position, and latch means for selectively supporting the lock arm in the unlocked position.

The hitch is preferably powered from the tractor hydraulics. The currently preferred embodiment of the invention is capable of lifting a tongue weight of approximately 1,900 pounds a distance of seven inches.

BRIEF DESCRIPTION OF THE DRAWINGS

In the accompanying drawings, which illustrate an exemplary embodiment of the present invention.

DETAILED DESCRIPTION

Figure 1:
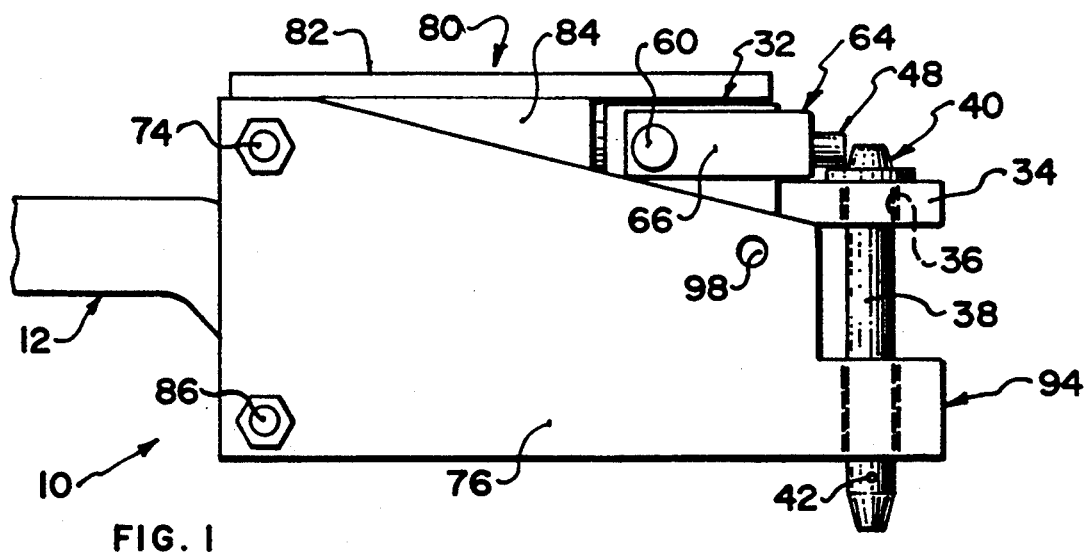
FIG. 1 is a side elevation of one embodiment of the apparatus in an engaged condition.

Referring to the accompanying drawings, there is illustrated a power operated hitch 10 mounted directly on a tractor draw bar 12. The hitch has an inner mounting structure 14 that consists of two parallel side plates 16 and 18 mounted on opposite sides of a horizontal cross plate 20. The cross plate 20 is fixed in the top of the draw bar 12 by three bolts 22 and associated nuts 24. Two of the bolts 22 extend through the conventional, existing hammer strap mounting holes 26 in the draw bar, while the third bolt passes through the existing draw pin hole 28.

The bolts 22 have tapered, frustoconical heads 30 located on the bottom of the draw bar 12.

Figure 5:
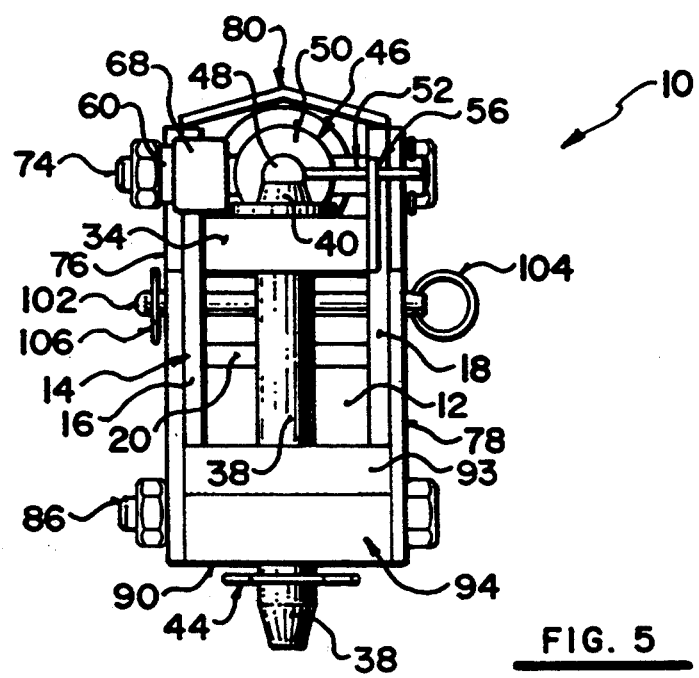
FIG. 5 is an end elevation of the apparatus of FIG. 1.

Each side plate 16 and 18 has a rectangular ear 32 projecting vertically from the top edge, at the rear. These are connected to opposite sides of a top hammer strap 34 that projects to the rear of the draw bar 12. The top hammer strap 34 has a draw pin hole 36 that accommodates a draw pin 38. The draw pin has a head 40 that rests on top of the top hammer strap. A retainer pin bore 42 extends diametrically through the draw pin near the end opposite the head to receive a retainer pin 44 as shown in FIG. 5.

The hitch is also provided with a draw pin lock 46 mounted on top of the top hammer strap. This includes a lock rod 48 sliding in a fore and aft oriented cylinder 50 mounted directly on the top of the top hammer strap. A handle 52 projects from the side of the rod 48 and is normally retained in a slot 54 in a keeper 56 mounted on the side of the top hammer strap 34. When the handle 52 is in the slot 56, the rod 48 projects over the head 40 of the draw pin to ensure that the draw pin cannot lift out of the draw pin hole in the top hammer strap. The draw pin lock may be retracted from the draw pin by pivoting the handle 52 out of the slot 54 and sliding the rod 48 forwards in the cylinder 50.

Forwardly of the cylinder 50, the ears 32 carry a transverse mounting pin 58 with an enlarged head 60 outside the side plate 16 and a cotter pin 62 outside the side plate 18. The mounting pin 58 carries a latch 64. This is a flat arm 66 with a tab 68 projecting centrally from its free end. The latch is freely pivotal on the mounting pin between the head 60 and the side plate 16.

Figure 2:
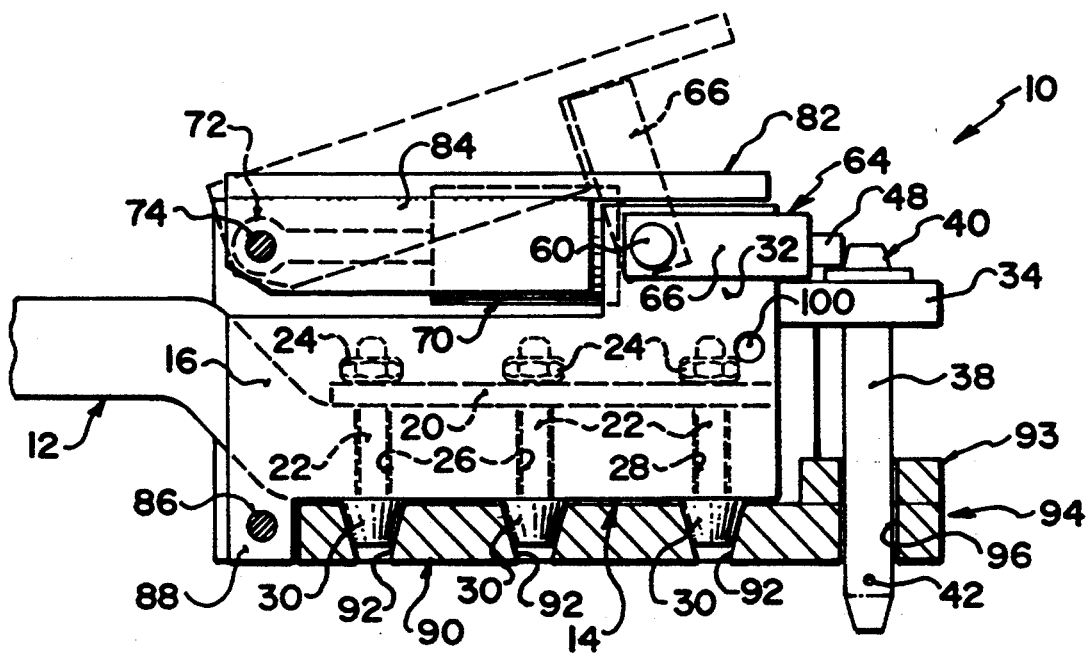
FIG. 2 is a side elevation of the apparatus of FIG. 1 partly in section.
Figure 3:
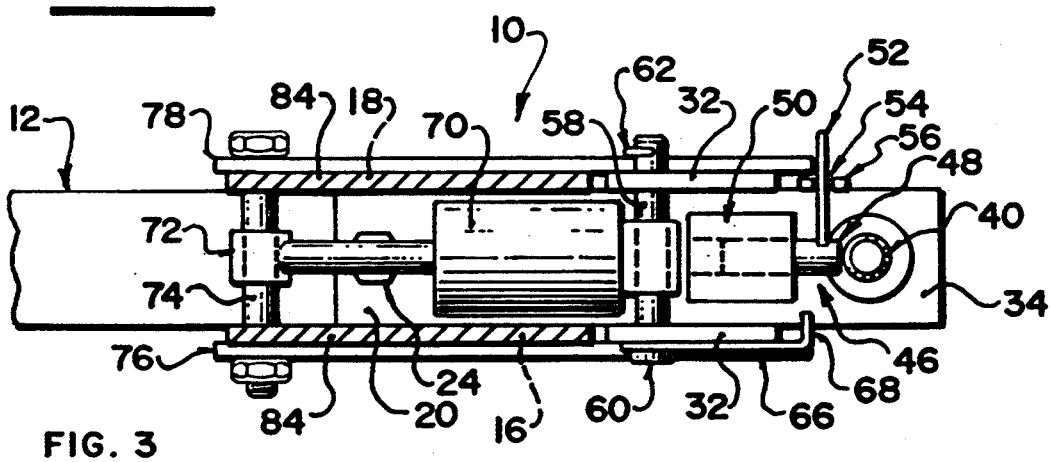
FIG. 3 is a plan view Of the apparatus of FIG. 1, with the cover removed.

The mounting pin 58 also serves to mount the cylinder end of a hydraulic cylinder 70 shown most particularly in FIGS. 2 and 3. The cylinder has a rod end 72 connected by a rod pin 74 to two side arms 76 and 78, the function of which will be described more fully in the following. Between the side arms, the rod pin 74 carries a lock arm 80 that includes a peaked cover panel extending from the rod end 72 rearwardly over the space between the side plates 16 and 18. The lock arm also includes lock plates 84 secured to the cover panel. The lock plates pivot on the rod pin 74 between a lowered locking position shown in full line in FIG. 2 and a raised unlocked position shown in broken line in the same Figure.

The two side arms 76 and 78 are pivotally connected on the outer sides of the side plates 16 and 18 by a pivot pin 86 extending through the bottom, front corners of the side arms and through lugs 88 at a similar location on the side plates 16 and 18. Between the bottom edges of the two side arms 76 and 78 is a mounting plate 90 that connects the two side arms. As shown in FIG. 2, the mounting plate is formed with three conical bores 92 that engage on the heads 30 of the bolts 22 securing the inner mounting frame 14 to the draw bar 12. The bores 92 disengage from the bolt heads when the side arms 76 and 78, pivot downwardly-around the pivot pin 86.

At the rear end of the mounting plate 90 is a block 93 mounted on the top of the mounting plate. The mounting plate and the block together constitute a bottom hammer strap 94. A draw pin hole 96 extends through the bottom hammer strap to fit over the end of the draw pin 38.

The side arms 76 and 78 are formed with apertures 98 adjacent their trailing ends. These align with apertures 100 in the side plates 16 and 18 when the side arms are raised to the engaged position illustrated in FIGS. 1 and 2. These holes may be used to receive a security pin 102 illustrated in FIG. 5 with a ring 104 on one end and a spring pin 106 acting as a retainer on the other.

Figure 4:
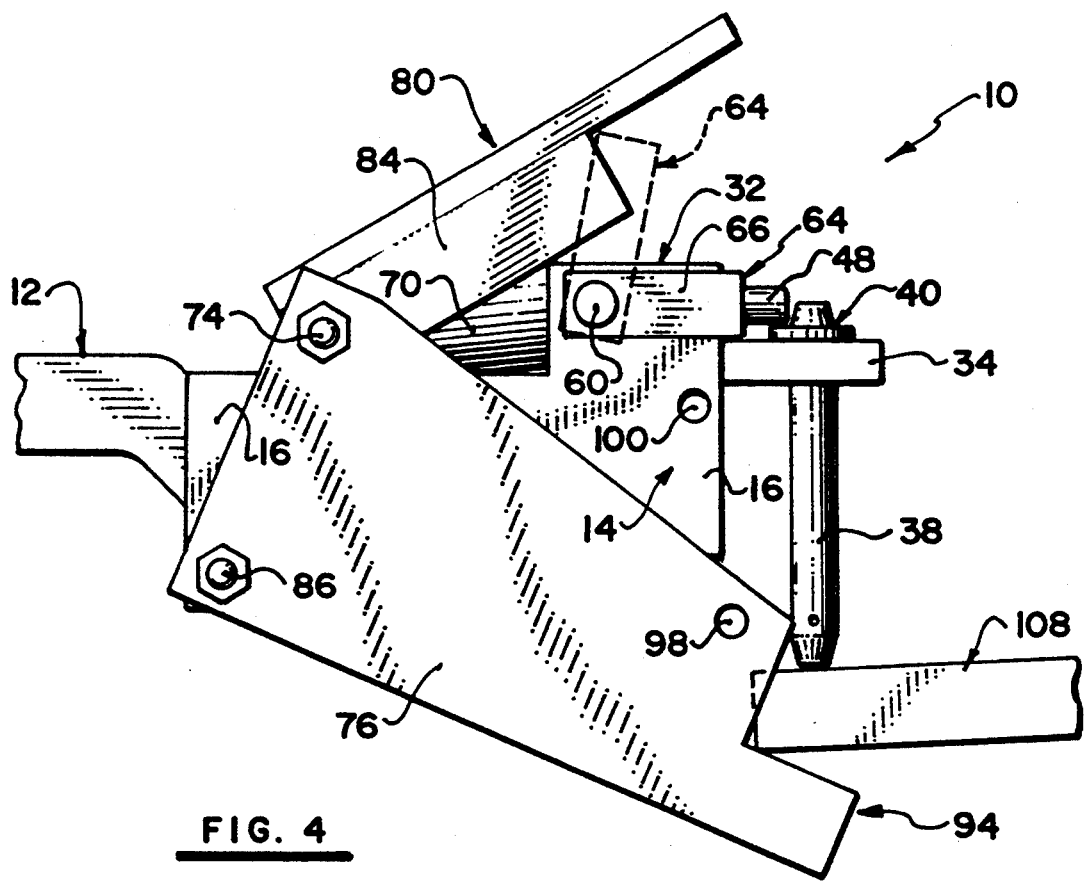
FIG. 4 is a side elevation of the apparatus of FIG. 1 in the released condition.

In use of the hitch, the bottom hammer strap 94 is moved to the released position illustrated in FIG. 4. At that time, the lock 80 is raised, with its plates 84 resting on the upper front corners of the side plate ears 32. The hitch can then be backed up to an implement tongue 108 until the bottom hammer strap 94 engages under the tongue. The hydraulic cylinder assembly is then extended to pivot the side arms 76 and 78 upwardly around the pivot pin 86, raising the mounting plate 90 and the bottom hammer strap 94. This lifts the tongue 108 onto the draw pin 38. In the currently preferred embodiment of the invention, the hitch can lift a tongue weight of up to 1,900 pounds a distance of seven inches. As the hitch approaches the engaged position illustrated in FIGS. 1 and 2, the plates 84 of the lock 80 move to the front of the ears 32, allowing the lock 80 to drop into the lowered locking position as shown in FIGS. 1 and 2. The rear edges of the plates 84 then confront the front edges of the ears 32, so that any movement of the bottom hammer strap downwardly around the pivot pin 86 will bring those faces into engagement to limit the movement in question. This is thus an automatic self-locking mechanism for the hitch.

To release the locking mechanism, the lock 80 is raised as illustrated in broken line FIG. 2 and the latch 64 is pivoted upwardly so the tab 68 engages under the cover 82 and behind the rear edge of plate 84. As shown in FIG. 2, this allows the contraction of the cylinder 70 and the movement of the bottom hammer strap to the released condition. As shown in broken line in FIG. 4, the latch 64 goes over centre as the hitch moves to the released condition and falls to a rest position as illustrated in FIGS. 1, 2 and 4.

In the engaged position of the hitch, the mounting plate 90 engages the bolt heads 30. This serves to transmit loads from the draw pin to the draw bar 12, through the bolts. Additional draft force is applied directly to the draw bar through the top hammer strap 34 and the inner support 14.

Figure 6:
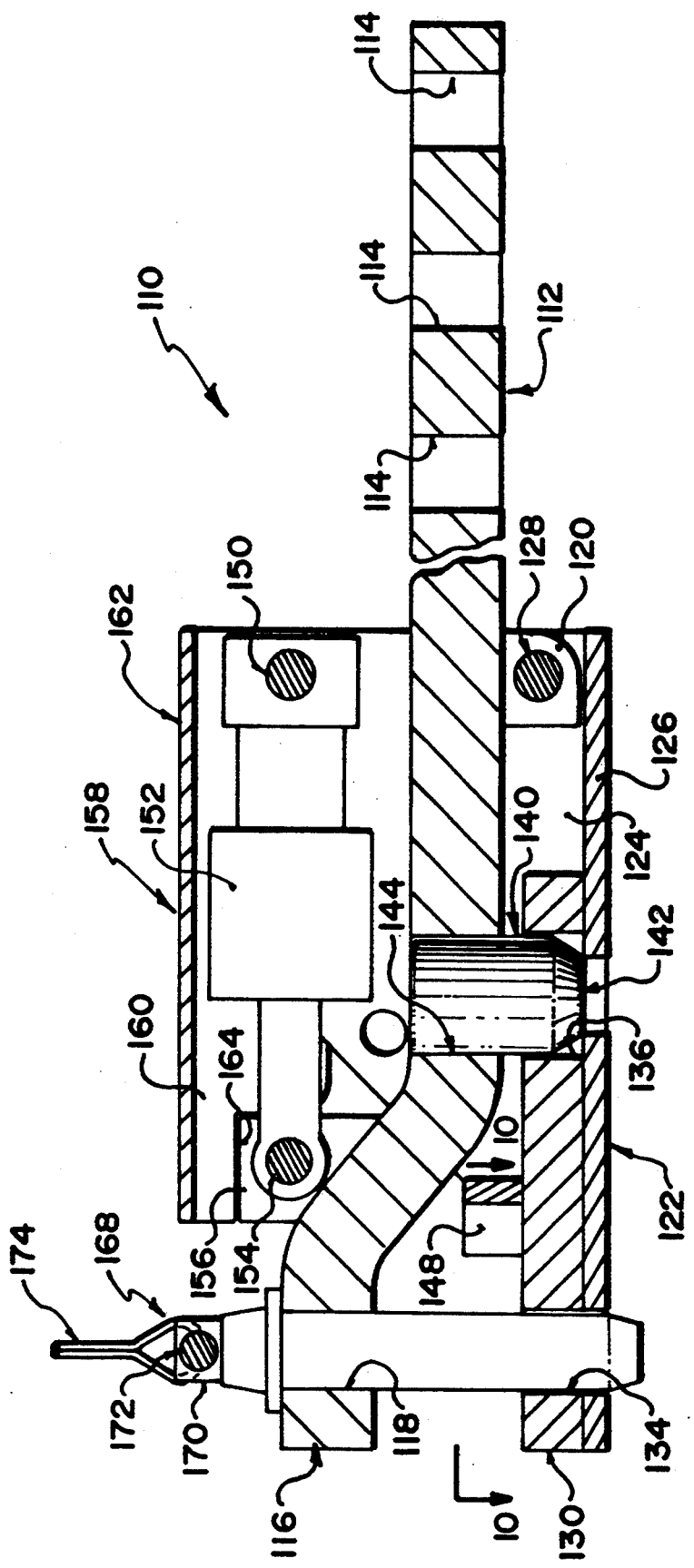
FIG. 6 is a side elevation, partly in section of another embodiment of the apparatus.
Figure 7:
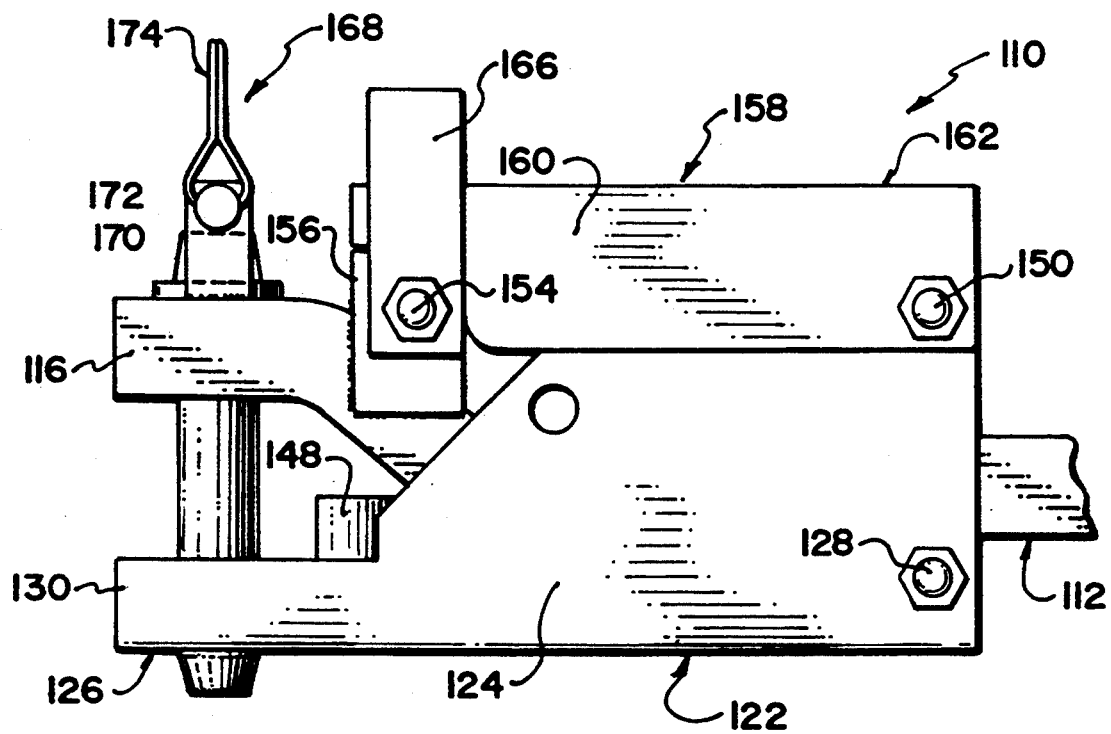
FIG. 7 is a side elevation of the apparatus of FIG. 6.
Figure 8:
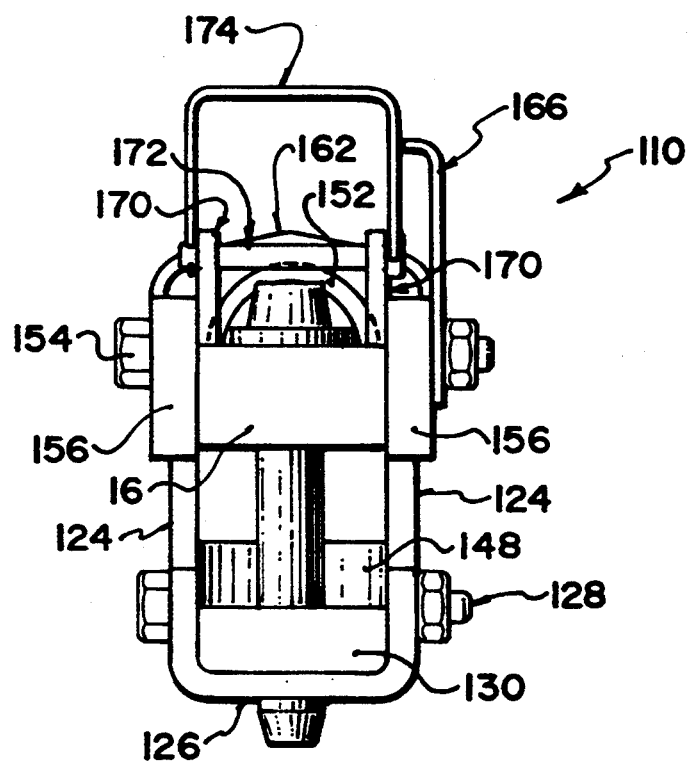
FIG. 8 is an end elevation of the apparatus of FIG. 6.

FIGS. 6 to 10 illustrate an alternative embodiment of the invention in the form of a complete draw bar assembly incorporating a hitch. The draw bar assembly is mounted on the tractor in place of the original draw bar, or it may be supplied as original equipment. Referring to FIGS. 6, 7 and 8, the draw bar assembly 110 includes a draw bar 112. This is an elongate rectangular steel bar with a forward mounting end having three mounting holes 114 for mounting the draw bar on a tractor. At the opposite, hitch end of the draw bar, the bar has two bends providing an upwardly offset end section 116. This end section has a drawpin hole 118 into which a headed drawpin is inserted from above, to extend downwardly.

Spaced forwardly from the hitch end of the draw bar are two mounting lugs 120 fixed to the bottom of the draw bar. These support a hammer strap carrier 122 that has two side plates 124 on opposite sides of the draw bar and a baseplate 126 below the draw bar. A pivot bolt 128 through pivot hole in the side plates and through the mounted lugs 120 pivotally mounts the carrier on the draw bar. A hammer strap 130 is welded on to the base plate 126. The hammer strap has a drawpin hole 134 that is, in the engaged position shown in FIGS. 6 and 7 aligned with the drawpin hole 118 in the draw bar. The hammer strap also has a large diameter hole 136 spaced from the drawpin hole for engagement with a stub pin 140 mounted on the draw bar. The stub pin has a tapered nose 142 to guide the hammer strap into proper engagement with the drawpin as it moves to the engaged position. When engaged with the hammer strap, the stub pin acts as an anchor, taking horizontal loads on the hammer strap. The stub pin extends upwardly through a bore 144 in the draw bar. The stub pin is welded to the draw bar. Unshaped cup 148, opening to the rear, is fixed to the top of the hammer strap. This centres and stops an implement tongue entering the hitch. The cup 148 is particularly useful with an adapter plate 192 (FIG. 10) mounted on the implement tongue.

The adapter has a leading end 194 with a curvature matching that of the cup 148. The draw pin is received in an oblong hole 196 which prevents binding when the tongue and draw bar are at a large vertical angle, as when crossing a ditch or the like.

A bolt 154 extends through the side plates 124 adjacent the forward edges of the plates and above the draw bar. The bolt carries the end or an hydraulic cylinder 152. The rod end of the cylinder is connected to a bolt 154 that is supported by two lugs 156 fastened to opposite sides of the draw bar between the bolt 150 and the drawpin. The forward bolt 150 also carries a locking cover 158 that has an inverted. U-shaped profile with two flat sides 160 and a slightly peaked top 162. At the rear of each side 160 is a notch 164 that engages the top and forward edge of the adjacent lug 156 when the cover is in the closed position illustrated in FIGS. 6 and 7.

The bolt 154 also carries an L-shaped latch 166 that will support the cover 158 in a raised position in the same way as the latch 66 or the embodiment illustrated in FIGS. 1 through 5.

The draw pin is retained in place by a draw pin retainer 168. This includes two lugs 170 fastened to the top of the draw bar on opposite sides of the draw pin head and a retainer pin 172 extending through aligned holes in the lugs, above the drawpin head.

The pin 172 is retained in place using a wire bale 174 connected to opposite ends of the pin, outside the lug.

The operation of this embodiment is similar to that of the embodiment of FIG. 1–5. In this case, the hitch is unitary with the draw bar while in the previous embodiment, the unit may be attached to an existing draw bar.

Figure 9:
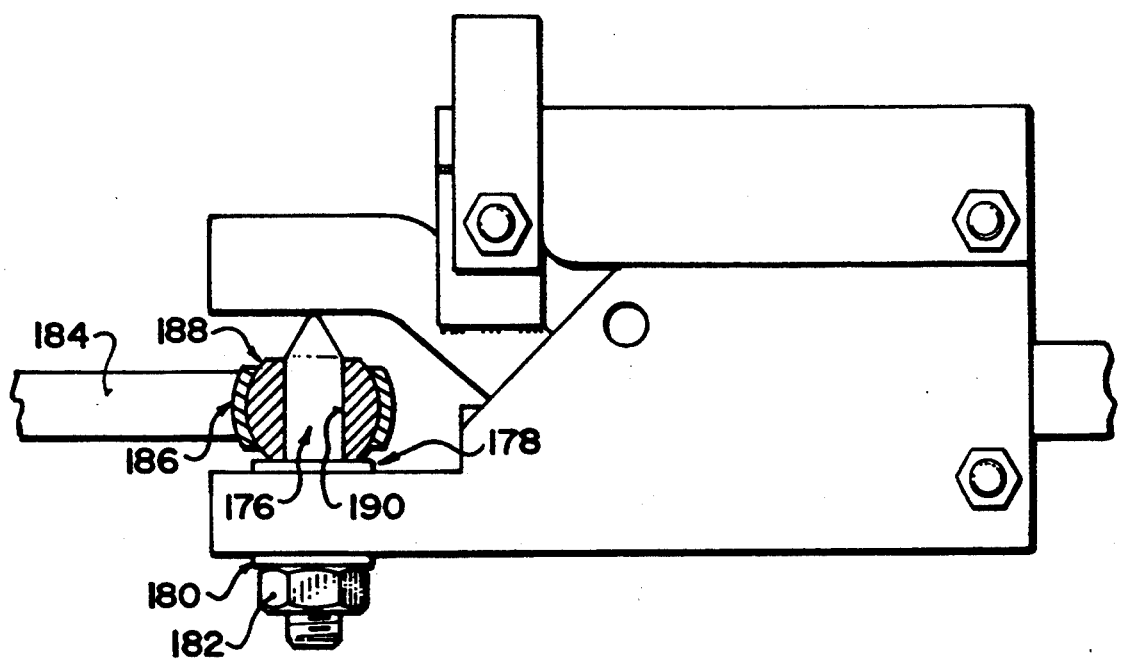
FIG. 9 illustrates the use of the apparatus with a ball and socket tongue.
Figure 10:
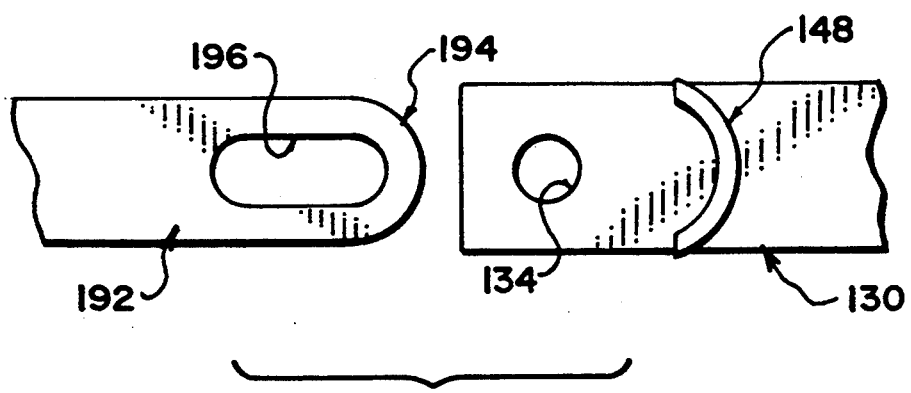
FIG. 10 is a view along line 10—10 of FIG. 6.

FIG. 9 illustrates the use of the present invention with a ball and socket type implement tongue. In this case, the drawpin is removed and a stub pin 176 is fastened in the drawpin hole in the bottom hammer strap so as to project upwardly towards the top hammer strap of the draw bar. The stub pin has a flange 178 that engages the top of the bottom hammer strap while it is secured in place using a washer 180 and a nut 182 on a threaded bottom end of the pin. The implement tongue 184 has a socket 186 carrying a ball 188 that swivels in the socket. A bore 190 through the ball receives the stub pin as the pin is lifted into engagement with the implement tongue. In the engaged position illustrated in FIG. 9, the top hammer strap or draw bar serves to prevent the tongue from jumping off the stub pin.

While certain embodiments of the invention have been described in the foregoing, it is to be understood that other embodiments are possible within the scope of the present invention. The invention is to be considered limited solely by the scope of the appended claims.

I claim:

1. A hitching apparatus for coupling a towing vehicle to a tongue of a towed vehicle, said apparatus comprising a draw bar on the towing vehicle; a draw pin; pin mounting means for mounting the draw pin on the draw bar, with the pin projecting downwardly; a bottom hammer strap having an opening therein for receiving the draw pin; and a bottom hammer strap mounting means for mounting the bottom hammer strap on the draw bar for movement between a retracted position below the draw pin and an engaged position with the opening engaged on the draw pin, spaced below the pin mounting means, whereby the bottom hammer strap may, in the retracted position, be engaged under the tongue and moved to the engaged position to raise the bottom hammer strap and the tongue into engagement with the draw pin, characterized in that:

in the engaged position, the bottom hammer strap extends along the bottom face of the draw bar, and inter-engagable means are provided on the draw bar and the bottom hammer strap for transmitting towing loads from the bottom hammer strap to the draw bar when the bottom hammer strap is in the engaged position, said inter-engageable means comprising projections on the draw bar and projection engaging means on the hammer strap.

2. Apparatus according to claim 1 wherein the inter-engageable means comprise projections on the bottom of the draw bar and projection receiving bores in the bottom hammer strap.

3. Apparatus according to claim 1 wherein the pin mounting means comprise an upper hammer strap having a draw pin aperture therein, and means for mounting the upper hammer strap on the draw bar.

4. Apparatus according to claim 3 wherein the means for mounting the upper hammer strap on the draw bar comprise two side plates secured to opposite sides of the upper hammer strap and a cross plate joining the side plates between the upper and bottom hammer straps.

5. Apparatus according to claim 4 including bolt means for securing the cross plate to the draw bar through existing hammer strap mounting holes in the draw bar.

6. Apparatus according to claim 5 wherein the bolt means further comprise means for securing the cross plate to the draw bar through an existing draw pin hole in the draw bar.

7. Apparatus according to claim 3 wherein the means for mounting the upper hammer strap on the draw bar comprises a plurality of bolts with tapered heads projecting below the bottom hammer strap comprises a plurality of tapered holes for engaging respective ones of the tapered head of the bolts.

8. A hitching apparatus for coupling a draw bar of a towing vehicle to a tongue of a towed vehicle, said apparatus comprising:

a draw pin; pin mounting means for mounting the draw pin on the draw bar, with the pin projecting downwardly; a bottom hammer strap having an opening therein for receiving the draw pin; a bottom hammer strap mounting means for mounting the bottom hammer strap on the draw bar for movement between a retracted position below the draw pin and an engaged position with the opening engaged on the draw pin, spaced below the pin mounting means; power operated means for moving the bottom hammer strap between the retracted and engaged position, whereby the bottom hammer strap may be engaged under the tongue and the power means actuated to raise the bottom hammer strap and the tongue into engagement with the draw pin; and lock means responsive to movement of the bottom hammer strap into the engaged position to lock the bottom hammer strap in the engaged position, characterized in that:

the lock means comprise a lock member having a locking position preventing movement of the bottom hammer strap to the retracted position and an unlocked position freeing the bottom hammer strap to move to the retracted position, and latch means having a support position for supporting the lock member in the unlocked position and a rest position releasing the lock member to move to the locked position, the latch means being selectively actuable to the support position and resetting to the rest position in response to movement of the bottom hammerstrap.

9. Apparatus according to claim 8 wherein the lock member is moveable from the unlocked position to the locked position in response to movement of the bottom hammer strap to the engaged position.

10. Apparatus according to claim 9 wherein the latch means are manually movable to the support position.

11. Apparatus according to claim 9 wherein the latch means is moveable from the support position to a rest position in response to movement of the bottom hammer strap to the retracted position.

12. Apparatus according to claim 9 wherein the power operated means comprises a hydraulic cylinder and means for mounting the hydraulic cylinder at a position above the draw bar and extending therealong.

13. A draw bar assembly mountable on a towing vehicle for coupling the vehicle to a tongue of a towed vehicle, said assembly comprising:
an elongate draw bar having a mounting end adapted to be mounted on the towing vehicle and an opposite hitch end with a draw pin hole therein;
hammer strap having a draw pin hole therein;
a hammer strap mounting means mounting the hammer strap on the draw bar below the hitch end thereof for movement between a retracted position and an engaged position closer to the draw bar and with the draw pin hole aligned with the draw pin hole of the draw bar;
power operated means for moving the hammer strap between the retracted and engaged positions; and
lock means responsive to movement of the hammer strap into the engaged position to lock the hammer strap in the engaged position; characterized in that:
the lock means comprise a lock arm, means mounting the lock arm on the hammer strap for movement therewith, the lock arm having a locking position engaging a stationary part of the assembly to prevent movement of the hammer strap to the retracted position and an unlocked position out of engagement with said stationary part of the assembly, freeing the bottom hammer strap to move to the retracted position, and
latch means for selectively supporting the lock arm in the unlocked position.

14. Apparatus according to claim 13 wherein the lock arm is moveable from the unlocked position to the locked position in response to movement of the hammer strap to the engaged position.

15. Apparatus according to claim 13 wherein the latch means are manually movable to a support position supporting the lock arm in the unlocked position.

16. Apparatus according to claim 13 wherein the latch means are moveable from the support position to a rest position in response to movement of the hammer strap to the retracted position.

17. Apparatus according to claim 13 wherein the hammer strap mounting means comprise pivot means mounting the hammer strap on the draw bar for pivotal movement between the retracted and engaged positions.

18. Apparatus according to claim 17 including interengageable means on the draw bar and the hammer strap preventing the hammer strap from moving longitudinally with respect to the draw bar when in the engaged position.

19. Apparatus according to claim 13 wherein the power operated means comprise a hydraulic cylinder positioned above the draw bar and extending therealong.

* * * * *